United States Patent
Lee (10) Patent No.: US 10,362,821 B2
(45) Date of Patent: Jul. 30, 2019

(54) OPENABLE GIFT PACKAGING DEVICE

(71) Applicant: IMPRINT DIAMOND CORP., Taipei (TW)

(72) Inventor: Cheng Ming Lee, Taipei (TW)

(73) Assignee: Imprint Diamond Corp., Sanchong, Taipei (TW)

(*) Notice: Subject to any disclaimer, the term of this patent is extended or adjusted under 35 U.S.C. 154(b) by 54 days.

(21) Appl. No.: 15/679,318

(22) Filed: Aug. 17, 2017

(65) Prior Publication Data
US 2019/0053559 A1    Feb. 21, 2019

(51) Int. Cl.
| | | |
|---|---|---|
| A41G 1/00 | (2006.01) | |
| A45C 11/16 | (2006.01) | |
| F16M 11/04 | (2006.01) | |
| F16M 11/28 | (2006.01) | |

(52) U.S. Cl.
CPC .............. A41G 1/002 (2013.01); A45C 11/16 (2013.01); F16M 11/041 (2013.01); F16M 11/28 (2013.01)

(58) Field of Classification Search
CPC .......... A41G 1/002; A41G 1/00; A41G 1/001; A45C 11/16; F16M 11/041; F16M 11/28
USPC .......... 428/12, 17, 24; 40/411; 446/310, 487
See application file for complete search history.

(56) References Cited

U.S. PATENT DOCUMENTS

| | | | | |
|---|---|---|---|---|
| 549,039 | A * | 10/1895 | Wenger .................... | G09F 19/08 40/411 |
| 4,738,881 | A * | 4/1988 | Lee ......................... | A41G 1/002 428/12 |
| 5,090,569 | A * | 2/1992 | Nissen .................... | A63H 37/00 206/457 |
| 5,522,758 | A * | 6/1996 | Liu ......................... | A63H 13/00 40/411 |
| 5,946,835 | A * | 9/1999 | Boyd ....................... | G09F 19/08 40/412 |
| 6,123,197 | A | 9/2000 | Marquez et al. | |
| 6,299,014 | B1 | 10/2001 | Nava et al. | |
| 7,861,444 | B2 * | 1/2011 | Marlow ................. | A41G 1/002 40/411 |
| 8,133,090 | B2 * | 3/2012 | Hardin .................... | A63H 3/50 40/411 |
| 8,528,733 | B2 | 9/2013 | D'Hollander | |
| 9,144,258 | B2 * | 9/2015 | Krivanek ............... | A41G 1/002 |
| 2008/0311315 | A1 * | 12/2008 | Marlow ................. | A41G 1/002 428/24 |
| 2008/0311316 | A1 * | 12/2008 | Marlow ................. | A41G 1/002 428/24 |
| 2010/0159162 | A1 * | 6/2010 | Hao ........................ | A41G 1/002 428/24 |

(Continued)

*Primary Examiner* — Chun Hoi Cheung
(74) *Attorney, Agent, or Firm* — Charles E. Baxley (57) ABSTRACT

A gift packaging device includes a support member, a stem slidably engaged through the support member and moveable up and down relative to the support member, a carrier member disposed on the stem for supporting a gift, a number of flaps pivotally attached to the support member and rotateable relative to the support member between a folded position where the gift is shielded with the flaps, and an opened position where the gift is viewable, and a number of links are coupled between the stem and the flaps for allowing the flaps to be rotated relative to the support member between the folded position and the opened position when the stem is moved relative to the support member of the support device.

11 Claims, 7 Drawing Sheets

(56) References Cited

U.S. PATENT DOCUMENTS

2012/0121826 A1* 5/2012 Marlow ................ A41G 1/001
428/24
2017/0112241 A1* 4/2017 Fukui ................... A44C 9/0053

* cited by examiner

OPENABLE GIFT PACKAGING DEVICE

BACKGROUND OF THE INVENTION

1. Field of the Invention

The present invention relates to a gift packaging device, and more particularly to a foldable and openable gift packaging device including a decorative structure or configuration for receiving or containing or storing a gift and including a foldable and openable structure or configuration for shielding and protecting the gift and for allowing the gift to be opened and to be seen selectively or optionally.

2. Description of the Prior Art

Typical gift supporting and/or packaging devices comprise a housing or container for receiving or containing or storing one or more gifts, and for shielding and protecting the gift.

For example, U.S. Pat. No. 6,123,197 to Marquez et al. discloses one of the typical gift supporting and/or packaging devices also comprising a typical housing or container for containing or storing the gift and for shielding and protecting the gift.

However, the typical housing or container may not be opened readily and quickly and the gift may not be shown quickly and surprisingly.

U.S. Pat. No. 6,299,014 to Nava et al., and U.S. Pat. No. 8,528,733 to D'Hollander disclose the other typical gift supporting and/or packaging devices comprising a housing or container for containing or storing the gift and for shielding and protecting the gift, and arranged for allowing the gift to be shown and seen by the public.

However, the gift may be shown and seen by the public, and the gift may not be shown surprisingly.

The present invention has arisen to mitigate and/or obviate the afore-described disadvantages of the conventional gift packaging devices.

SUMMARY OF THE INVENTION

The primary objective of the present invention is to provide a gift packaging device including a decorative structure or configuration for receiving or containing or storing a gift and including a foldable and openable structure or configuration for shielding and protecting the gift and for allowing the gift to be opened and to be seen selectively or optionally.

In accordance with one aspect of the invention, there is provided a gift packaging device comprising a support device including a support member, a bore formed in the support member, a stem slidably received and engaged through the bore of the support member and moveable up and down relative to the support member, the stem including an upper portion located above the support member, a carrier member disposed on the stem for supporting a gift, a number of flaps pivotally attached to the support member and rotateable relative to the support member between a folded position where the gift is covered and shielded with the flaps, and an opened position where the gift is viewable, and a number of links coupled between the stem and the flaps for allowing the flaps to be rotated relative to the support member between the folded position and the opened position when the stem is moved relative to the support member of the support device.

The support member includes a number of protrusions extended from the support member, and the flaps each include a stud pivotally attached to the protrusions of the support member. The protrusions of the support member are equally spaced from each other for forming a number of notches between the protrusions and for slidably receiving and engaging with the studs of the flaps.

The protrusions of the support member each include a slot formed in each of two sides of each of the protrusions and communicating with the notches of the support member respectively, and the flaps each include an axle extended from the stud and engaged in the slots of the protrusions.

The stem includes a peripheral member provided on the upper portion of the stem, and the links each include a first end portion pivotally coupled to the peripheral member of the stem, and a second end portion pivotally coupled to the stud of the flap with a pivot pin. The flaps are petals. The stem includes a bottom end portion attached to a stand.

A receptacle may further be provided and includes a compartment formed in the receptacle for slidably receiving and engaging with the stem. The receptacle includes a number of openings formed in the receptacle, and the support device includes a number of catches for selectively engaging with the openings of the receptacle and for detachably securing the receptacle to the support device.

A number of extension members may further be provided and attached to the receptacle. The receptacle includes a number of posts extended from the receptacle, and the extension members each include at least one orifice for engaging with the posts and for securing the extension members to the receptacle. The receptacle includes a number of auxiliary extension members attached to the receptacle.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-6, a gift packaging device in accordance with the present invention comprises a support device 10 including a substantially annular or collar or ring-shaped structure or configuration (FIGS. 4, 5) having a through hole or bore 11 formed therein and formed or defined by an annular or peripheral or ring-shaped support member 12, and including one or more (such as six) bulges or protrusions 13 extended from the ring-shaped support member 12, such as extended upwardly from the upper peripheral portion of the ring-shaped support member 12, and equally spaced from each other for forming or defining a number of, or six gaps or notches 14 between the protrusions 13, and including a groove or slot 15 formed in each side of each of the protrusions 13 and communicating with the notches 14 of the ring-shaped support member 12 of the support device 10 respectively.

Figure 1:
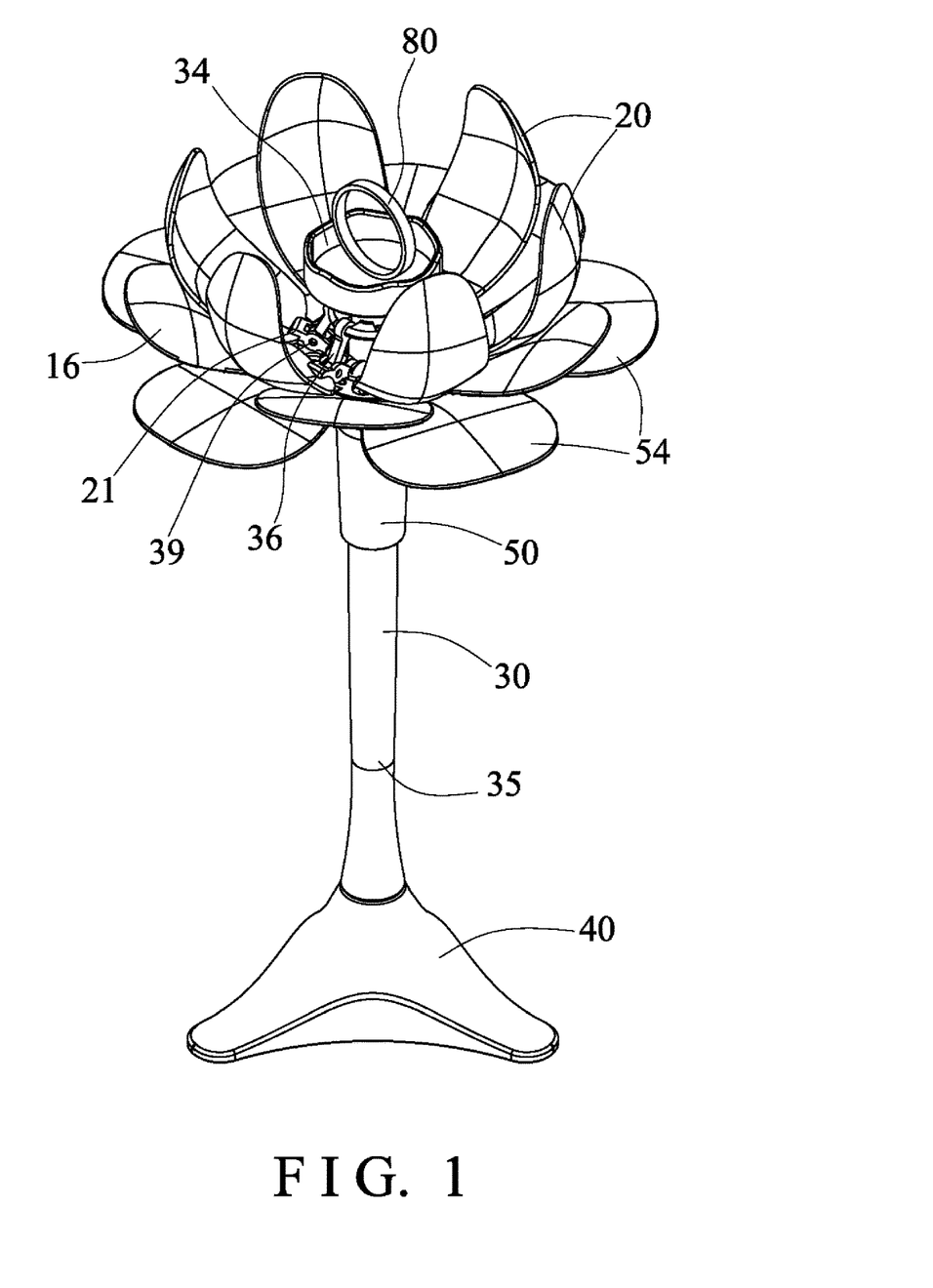
FIG. 1 is a perspective view of a gift packaging device in accordance with the present invention.
Figure 2:
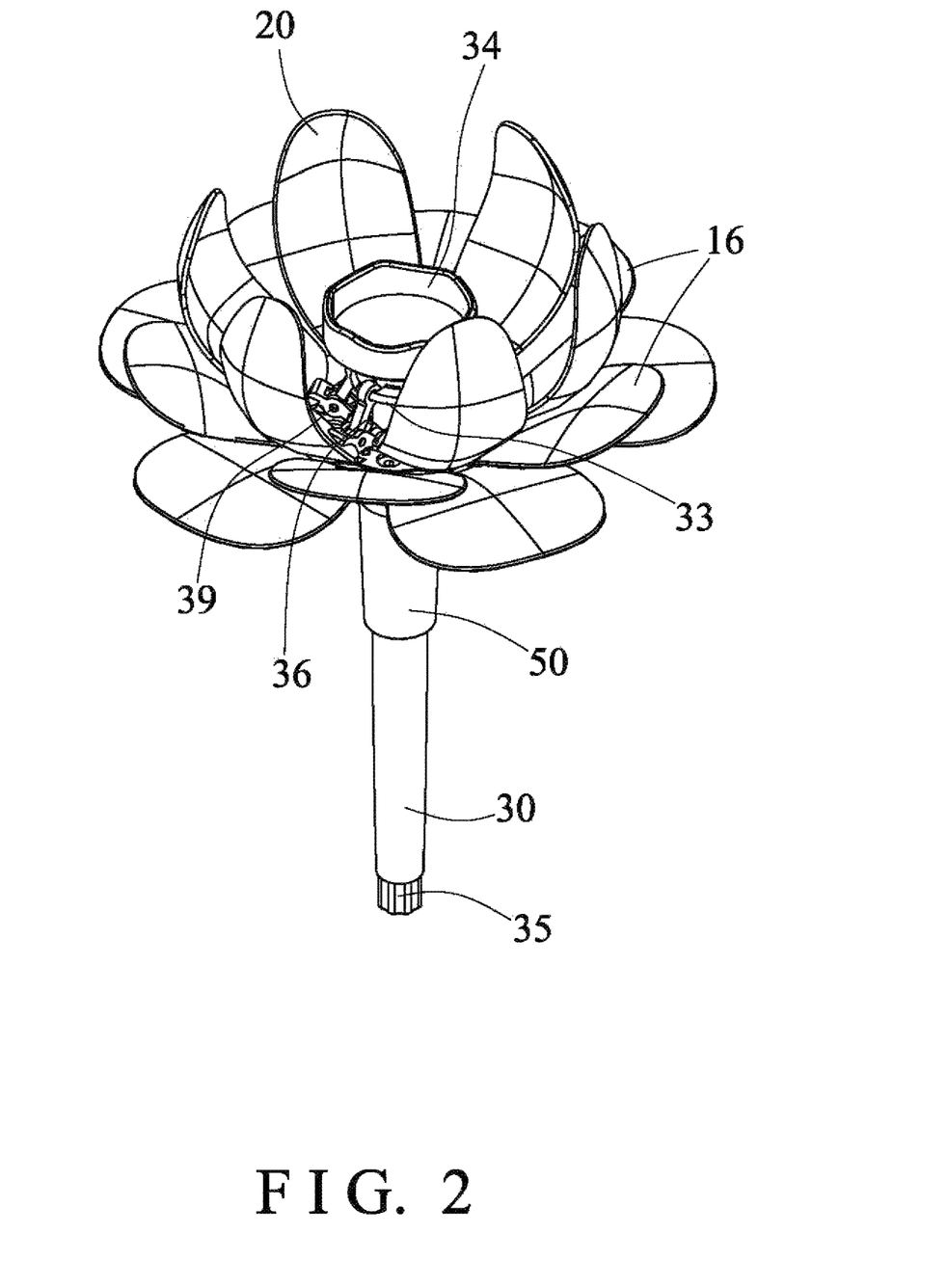
FIG. 2 is a partial perspective view of the gift packaging device.

One or more (such as five) blades or decorative extension members 16, such as tree leaves 16, may further be provided and disposed or attached or mounted or supported beside or around the ring-shaped support member 12 of the support device 10 (FIG. 4) and preferably arranged and equally spaced from each other, the decorative extension members 16 may be offset and spaced or separated from the support member 12 selectively or optionally, or may be formed integral with support member 12 selectively or optionally. One or more (such as six) petals or flaps 20 each include a root portion or stud 21 slidably received or engaged in the notches 14 of the ring-shaped support member 12 of the support device 10 respectively, and each include a pin or axle 22 extended laterally and outwardly therefrom and received or engaged in the slots 15 of the protrusions 13 for allowing the petals or flaps 20 to be pivotally or rotatably attached or mounted or secured or coupled to the ring-shaped support member 12 of the support device 10. For example, the petals or flaps 20 may be pivoted or rotated relative to the support member 12 of the support device 10 between an upwardly extended or folded position (FIG. 6) and an outwardly extended or opened position (FIGS. 1-2 and 7).

A shank or stem 30 is slidably received or engaged through the bore 11 of the support device 10 and moveable up and down relative to the support device 10, and the stem 30 includes an upper portion 31 extended upwardly beyond the support device 10 and/or located above the support device 10, and includes a ring or annular or peripheral member 33 formed or provided on the upper portion 31 of the stem 30. A tray or carrier member 34 is disposed or attached or mounted or secured on top of the stem 30 (FIGS. 1-3 and 6-7) for supporting a gift 80 (FIGS. 1 and 6-7), such as a diamond ring 80 or the like. One or more (such as six) arms or links 36 are connected or coupled between the stem 30, such as the upper portion 31 of the stem 30, and the petals or flaps 20, such as the studs 21 of the petals or flaps 20, and arranged for allowing the flaps 20 to be pivoted or rotated relative to the support member 12 of the support device 10 to the upwardly extended or folded position (FIG. 6) when the stem 30 is moved down or up relative to the support device 10, and/or to be pivoted or rotated to the outwardly extended or opened position (FIGS. 1-2 and 7) when the stem 30 is moved up or down relative to the support device 10.

For example, the links 36 each include an upper or first end portion 37 pivotally or rotatably attached or mounted or coupled to the stem 30, such as the upper portion 31 of the stem 30, and another or second end portion 38 pivotally or rotatably attached or mounted or coupled to the respective flap 20, such as the stud 21 of the flap 20 with a pivot pin 39 for allowing the flaps 20 to be pivoted or rotated relative to the support member 12 of the support device 10 with the stem 30 when the stem 30 is moved up and down relative to the support device 10. Alternatively, the links 36 may also be arranged to pivot or rotate the flaps 20 to the upwardly extended or folded position (FIG. 6) when the stem 30 is moved up relative to the support device 10, and/or may be arranged to pivot or rotate the flaps 20 to the outwardly extended or opened position (FIGS. 1-2 and 7) when the stem 30 is moved down relative to the support device 10.

Figure 6:
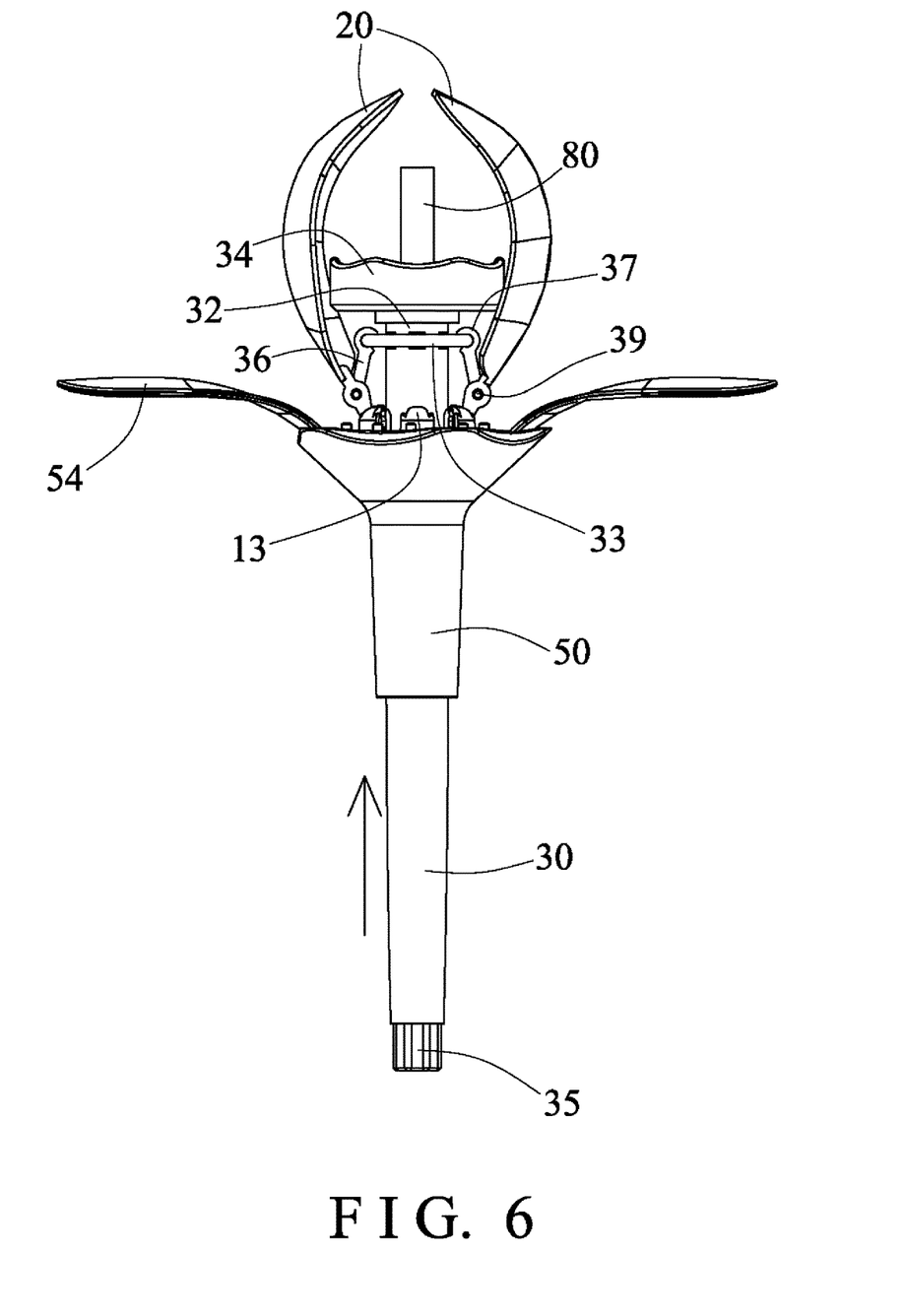
FIG. 6 is a plan schematic view of the gift packaging device.
Figure 7:
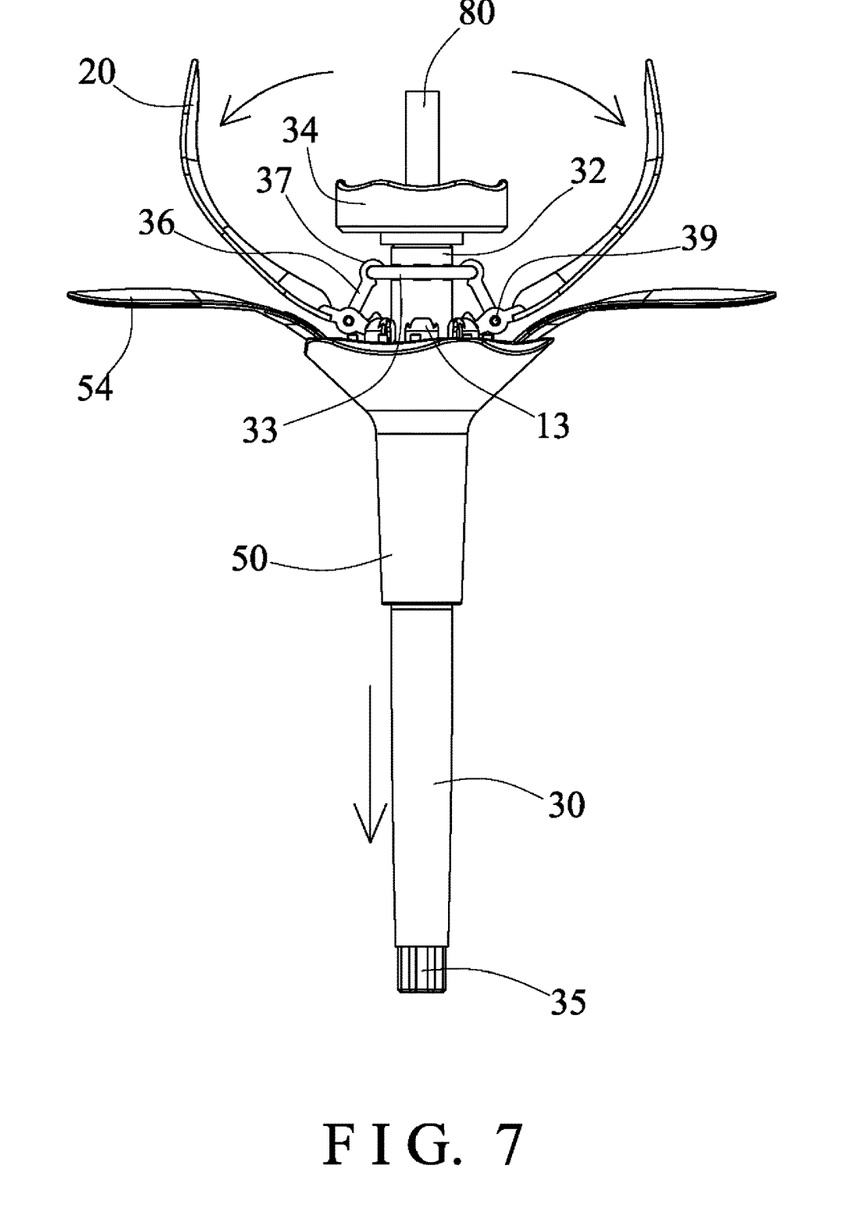
FIG. 7 is another plan schematic view similar to FIG. 6, illustrating the operation of the gift packaging device.

In operation, as shown in FIG. 6, when the stem 30 is moved down or up relative to the support device 10, the flaps 20 may be pivoted or rotated relative to the support member 12 of the support device 10 to the upwardly extended or folded position in order to cover and shield and protect the gift 80 for preventing the gift 80 from being shown and seen by the public. As shown in FIG. 7, when the stem 30 is moved up or down relative to the support device 10, the flaps 20 may be pivoted or rotated relative to the support member 12 of the support device 10 to the outwardly extended or opened position for allowing the gift 80 to be opened and to be seen by the lover, for example, selectively or optionally. As shown in FIG. 1, the lower or bottom end portion 35 of the stem 30 may be attached or mounted or secured to the stand 40 for allowing the stem 30 and the gift 80 to be erectly supported on a supporting table (not illustrated) or the like.

As shown in FIGS. 1-4, the gift packaging device in accordance with the present invention may further comprise an outer housing or receptacle 50 including a through hole or bore or compartment 51 formed therein (FIG. 4) for slidably receiving or engaging with the stem 30, and including one or more notches or openings 52 formed therein (FIG. 4), and the support device 10 includes one or more tongues or catches 19 formed or provided thereon or extended therefrom for selectively engaging with the notches or openings 52 of the receptacle 50 and for detachably or changeably or removably attaching or mounting or securing or coupling the receptacle 50 to the support device 10, or for coupling the support device 10 to the receptacle 50, and thus for allowing the support device 10 and the receptacle 50 to be moved in concert with each other relative to the stem 30.

Figure 3:
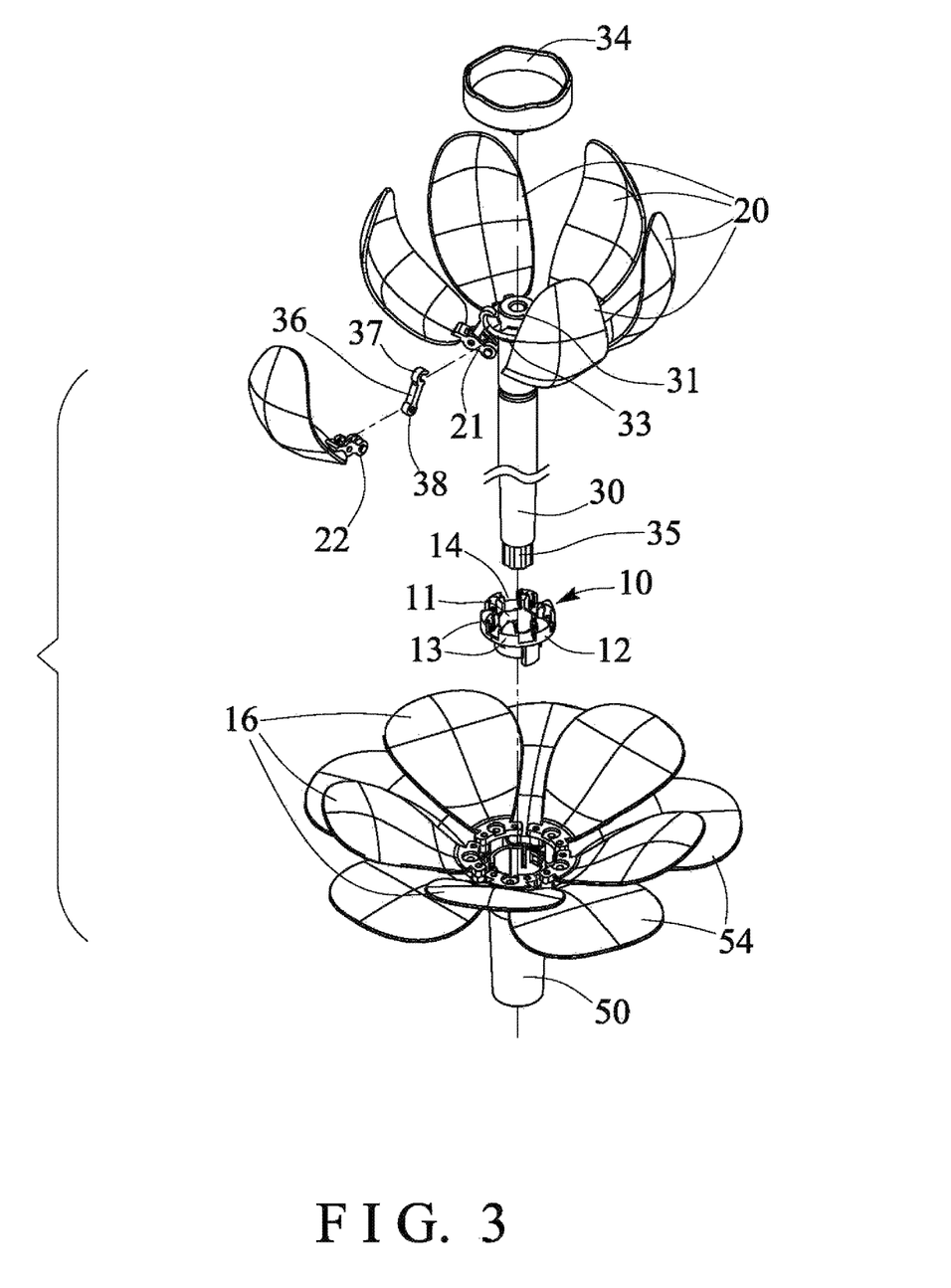
FIG. 3 is a partial exploded view of the gift packaging device.
Figure 4:
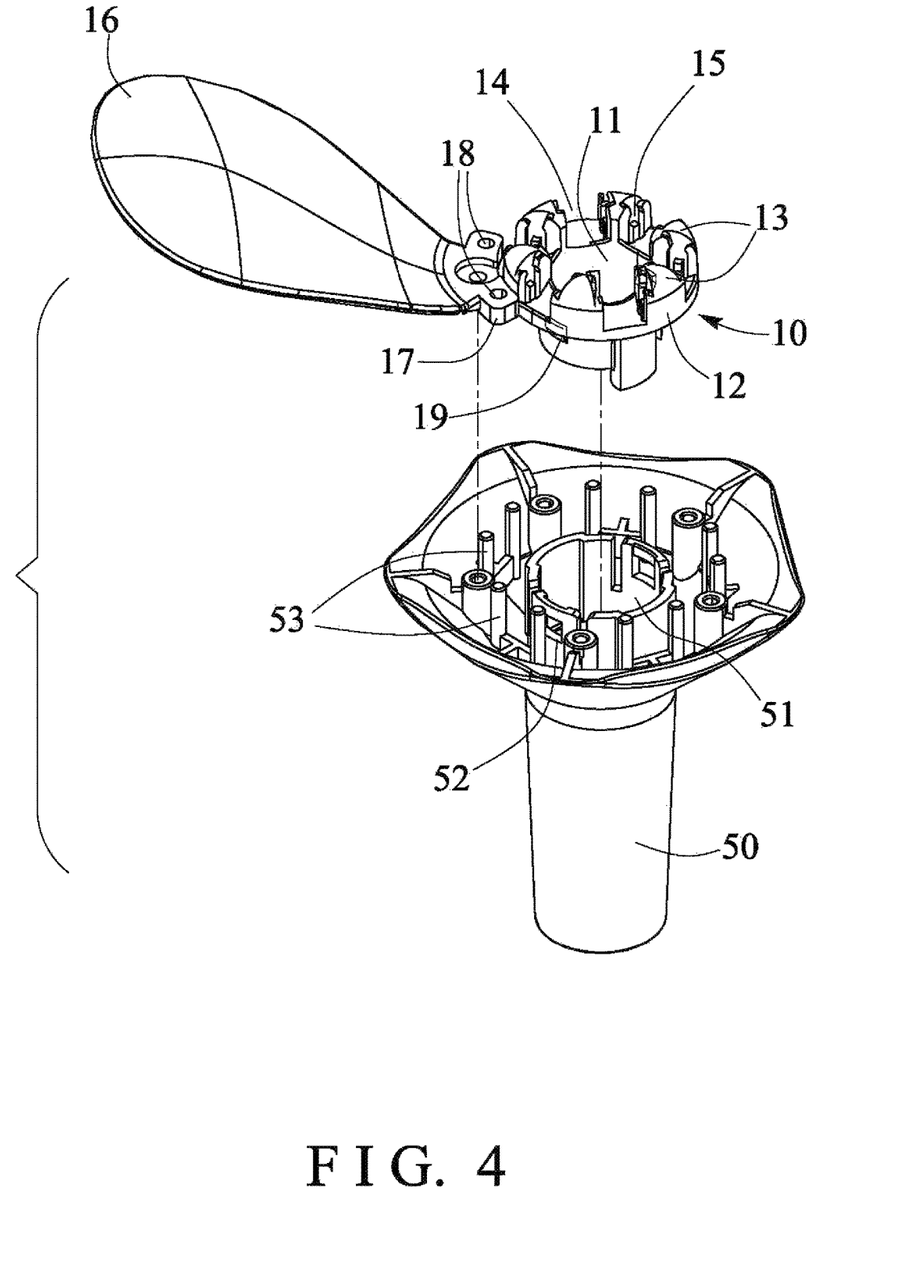
FIG. 4 is another partial exploded view of the gift packaging device.
Figure 5:
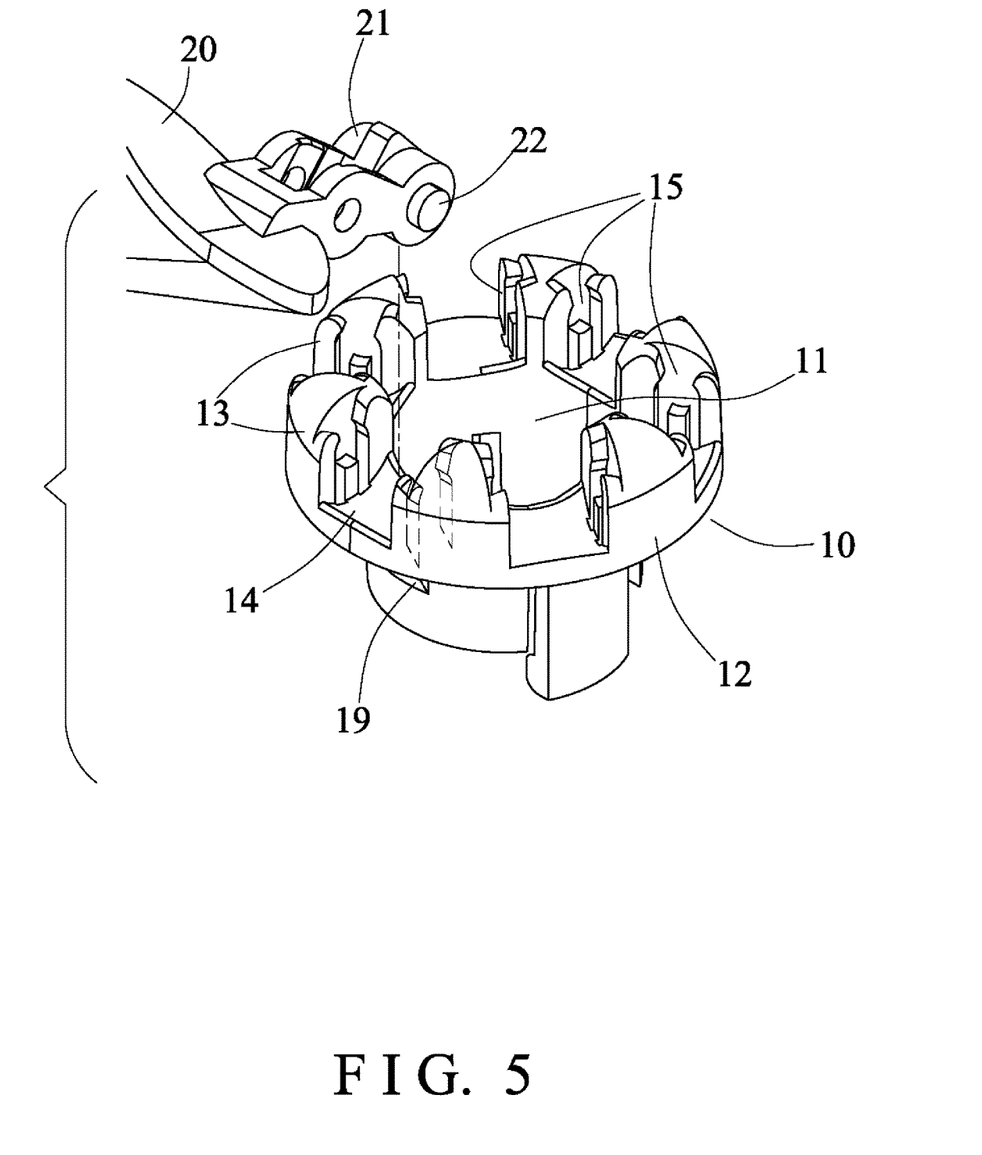
FIG. 5 is a further partial exploded view of the gift packaging device.

As also shown in FIG. 4, the tree leaves or blades or decorative extension members 16 each may further include one or more (such as two) apertures or orifices 18 formed in the base or root portion 17 thereof, and the receptacle 50 may further include one or more (such as five pairs of) columns or posts 53 extended therefrom for engaging with the orifices 18 of the decorative extension members 16 with such as a force-fitted engagement, for allowing the decorative extension members 16 to be selectively and solidly and stably attached or mounted or secured to or supported on the receptacle 50. As shown in FIGS. 1-3, the receptacle 50 may further include one or more auxiliary blades or decorative extension members 54, such as tree leaves 54, disposed or attached or mounted or supported thereon and disposed or located below the decorative extension members 16 for decorative purposes or the like.

Accordingly, the gift packaging device in accordance with the present invention includes a decorative structure or configuration for receiving or containing or storing a gift and including a foldable and openable structure or configuration for shielding and protecting the gift and for allowing the gift to be opened and to be seen selectively or optionally.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A gift packaging device comprising:
a support device including a support member, a bore formed in said support member;
a stem slidably received and engaged through said bore of said support member and moveable up and down relative to said support member, said stem including an upper portion located above said support member, a carrier member disposed on said stem for supporting a gift, a plurality of flaps pivotally attached to said support member and rotateable relative to said support member between a folded position where the gift is covered and shielded with said flaps, and an opened position where the gift is viewable, and a plurality of links coupled between said stem and said flaps for allowing said flaps to be rotated relative to said support member between said folded position and said opened position when said stem is moved relative to said support member of said support device, wherein said support member includes a plurality of protrusions extended from said support member, and said flaps each include a stud pivotally attached to said protrusions of said support member.

2. The gift packaging device as claimed in claim 1, wherein said protrusions of said support member are equally spaced from each other for forming a plurality of notches between said protrusions and for slidably receiving and engaging with said studs of said flaps.

3. The gift packaging device as claimed in claim 2, wherein said protrusions of said support member each include a slot formed in each of two sides of each of said protrusions and communicating with said notches of said support member respectively, and said flaps each include an axle extended from said stud and engaged in said slots of said protrusions.

4. The gift packaging device as claimed in claim 1, wherein said stem includes a peripheral member provided on said upper portion of said stem, and said links each include a first end portion pivotally coupled to said peripheral member of said stem, and a second end portion pivotally coupled to said stud of said flap with a pivot pin.

5. The gift packaging device as claimed in claim 1, wherein said flaps are petals.

6. The gift packaging device as claimed in claim 1, wherein said stem includes a bottom end portion attached to a stand.

7. The gift packaging device as claimed in claim 1 further comprising a receptacle including a compartment formed in said receptacle for slidably receiving and engaging with said stem.

8. A gift packaging device comprising:

a support device including a support member, a bore formed in said support member;

a stem slidably received and engaged through said bore of said support member and moveable up and down relative to said support member, said stem including an upper portion located above said support member, a carrier member disposed on said stem for supporting a gift, a plurality of flaps pivotally attached to said support member and rotateable relative to said support member between a folded position where the gift is covered and shielded with said flaps, and an opened position where the gift is viewable, a plurality of links coupled between said stem and said flaps for allowing said flaps to be rotated relative to said support member between said folded position and said opened position when said stem is moved relative to said support member of said support device, and a receptacle including a compartment formed in said receptacle for slidably receiving and engaging with said stem, wherein said receptacle includes a plurality of openings formed in said receptacle, and said support device includes a plurality of catches for selectively engaging with said openings of said receptacle and for detachably securing said receptacle to said support device.

9. The gift packaging device as claimed in claim 7 further comprising a plurality of extension members attached to said receptacle.

10. The gift packaging device as claimed in claim 9, wherein said receptacle includes a plurality of posts extended from said receptacle, and said extension members each include at least one orifice for engaging with said posts and for securing said extension members to said receptacle.

11. The gift packaging device as claimed in claim 9, wherein said receptacle includes a plurality of auxiliary extension members attached to said receptacle.

* * * * *